(12) United States Patent
Fan et al.

(10) Patent No.: US 11,804,702 B2
(45) Date of Patent: Oct. 31, 2023

(54) CABLE-WINDING CHARGER

(71) Applicant: DONGGUAN LUXSHARE PRECISION INDUSTRY CO. LTD., Dongguan (CN)

(72) Inventors: Li Fan, Dongguan (CN); Min Fan, Dongguan (CN); Yun Feng, Dongguan (CN); Wei-Dong Chen, Dongguan (CN)

(73) Assignee: DONGGUAN LUXSHARE PRECISION INDUSTRY CO. LTD., Guandong (CN)

( * ) Notice: Subject to any disclaimer, the term of this patent is extended or adjusted under 35 U.S.C. 154(b) by 282 days.

(21) Appl. No.: 17/315,673

(22) Filed: May 10, 2021

(65) Prior Publication Data

US 2021/0265828 A1  Aug. 26, 2021

(30) Foreign Application Priority Data

Nov. 24, 2020 (CN) .......................... 202011327948.X

(51) Int. Cl.
| | |
|---|---|
| *H02G 11/02* | (2006.01) |
| *B65H 75/48* | (2006.01) |
| *H01R 13/66* | (2006.01) |
| *H02J 7/00* | (2006.01) |

(52) U.S. Cl.
CPC ............ *H02G 11/02* (2013.01); *B65H 75/48* (2013.01); *H01R 13/665* (2013.01); *H02J 7/0042* (2013.01); *B65H 2701/3919* (2013.01)

(58) Field of Classification Search
CPC ............ B65H 74/48; B65H 2701/3919; H01R 13/665

USPC ............................................................. 439/4
See application file for complete search history.

(56) References Cited

U.S. PATENT DOCUMENTS

| | | | | |
|---|---|---|---|---|
| 6,803,525 | B1 * | 10/2004 | Liao ................... | B65H 75/4423 |
| | | | | 439/35 |
| 7,984,799 | B2 * | 7/2011 | Huang ................... | H01R 31/06 |
| | | | | 191/12.2 R |
| 10,461,552 | B2 * | 10/2019 | Loewen ............... | H02J 7/0042 |

(Continued)

FOREIGN PATENT DOCUMENTS

| | | |
|---|---|---|
| CN | 1901292 A | 1/2007 |
| CN | 202474484 U | 10/2012 |

(Continued)

*Primary Examiner* — Alexander Gilman
(74) *Attorney, Agent, or Firm* — Birch, Stewart, Kolasch & Birch, LLP

(57) ABSTRACT

A cable-winding charger includes a housing, a main circuit board, a plug, a pivot base, a torsion spring, and a data cable. The main circuit board is in the housing and includes conductive rings. The conductive rings are coaxially arranged around the column of the housing. The plug is pivotally connected to the housing and electrically connected to the main circuit board. The pivot base is pivotally connected to the housing. Each conductive piece of the pivot base contacts the corresponding conductive ring. One end of the torsion spring is fixed to the column, and the other end of the torsion spring is fixed to the pivot base. One end of the cable body of the data cable is electrically connected to the conductive pieces, and the other end of the cable body is electrically connected to the connection port.

19 Claims, 12 Drawing Sheets

(56) References Cited

U.S. PATENT DOCUMENTS

| | | | |
|---|---|---|---|
| 2005/0236243 A1* | 10/2005 | Huang | H02G 11/02 |
| | | | 191/12.4 |
| 2007/0026727 A1 | 2/2007 | Lo | |
| 2012/0113645 A1* | 5/2012 | Liao | F21V 33/0052 |
| | | | 362/253 |
| 2014/0077759 A1* | 3/2014 | Liao | H02J 50/10 |
| | | | 320/108 |
| 2018/0138683 A1* | 5/2018 | Girdzis | H02J 50/402 |
| 2018/0269672 A1* | 9/2018 | Ebrahimi Afrouzi | B65H 75/30 |
| 2021/0265828 A1* | 8/2021 | Fan | H01R 31/065 |

FOREIGN PATENT DOCUMENTS

| | | |
|---|---|---|
| CN | 105743154 A | 7/2016 |
| CN | 208889980 U | 5/2019 |
| CN | 209250295 U | 8/2019 |
| CN | 111146655 A | 5/2020 |
| CN | 306168630 S | 11/2020 |
| EP | 1 239 554 A1 | 9/2002 |
| JP | 3141522 U | 5/2008 |
| TW | M571086 U | 12/2018 |

* cited by examiner

CABLE-WINDING CHARGER

CROSS-REFERENCE TO RELATED APPLICATION

This non-provisional application claims priority under 35 U.S.C. § 119(a) to Patent Application No. 202011327948.X filed in China, P.R.C. on Nov. 24, 2020, the entire contents of which are hereby incorporated by reference.

BACKGROUND

Technical Field

The instant disclosure relates to a charger, in particular, to a charger capable of receiving a cable.

Related Art

Along with rapid iterations of integrated circuits, processing abilities of electronic devices also increase, and the electronic devices become thinner, shorter, and smaller. When going out, nowadays people bring at least one portable computer device, e.g., a mobile phone, a tablet computer, or a notebook computer. Since the portable computer device is used frequently, the power consumption of the portable computer device increases. Therefore, when going out, people bring not only the portable computer device, but also the charger for the portable computer device.

SUMMARY

A charger known to the inventor(s) has a connection cable for connected to a portable computer device. Since the connection cable has a longer length, the charger known to the inventor(s) cannot be carried conveniently. Furthermore, the charger known to the inventor(s) provides a single type connection port (namely, a single connection interface). As a result, the charger cannot be used for charging electronic device with different connection interfaces.

In view of this, in one or some embodiments, a cable-winding charger is provided. The cable-winding charger comprises a housing, a main circuit board, a plug, a pivot base, a torsion spring, and a data cable. The housing comprises a column. The main circuit board is in the housing and comprises a plurality of conductive rings. The conductive rings are coaxially arranged around the column. One of two ends of the plug is pivotally connected to the housing and is electrically connected to the main circuit board. The pivot base is pivotally connected to the housing by taking the column as a pivoting axis. The pivot base comprises a plurality of conductive pieces. Each of the conductive pieces contacts the corresponding conductive ring. One of two ends of the torsion spring is fixed to the column, and the other end of the torsion spring is fixed to the pivot base. The data cable comprises a connection port and a cable body. One of two ends of the cable body is electrically connected to the conductive pieces, and the other end of the cable body is electrically connected to the connection port. A portion of the cable body is winded around the pivot base, and the connection port is exposed out of the housing. When the torsion spring is in a released state, the connection port is in a received state.

In some embodiments, the conductive rings are an outer ring and at least one inner ring, and at least three of the conductive pieces are spacedly arranged on the outer ring.

In some embodiments, the conductive rings are an outer ring, a middle ring, and at least one inner ring, and at least three of the conductive pieces are spacedly arranged on the middle ring.

In some embodiments, the housing comprises an outer shell, an outer cover, a lower shell, and an upper shell. The upper shell comprises the column. The pivot base and the torsion spring are received between the lower shell and the upper shell. The lower shell and the main circuit board are fixed to the outer shell. The lower shell and the upper shell are received between the outer shell and the outer cover.

In some embodiments, the cable-winding charger further comprises a sub circuit board. The sub circuit board comprises a plurality of holes and the conductive pieces. The sub circuit board is fixedly disposed on the pivot base. Each of the conductive pieces passes through the corresponding hole. One end of each of the conductive pieces is fixed to one side of the corresponding hole.

As above, according to one or some embodiments of the instant disclosure, a cable-winding charger is provided. The data cable can be integrally received in the charger, and the extension length of the data cable may be adjusted according to different scenarios.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1A:
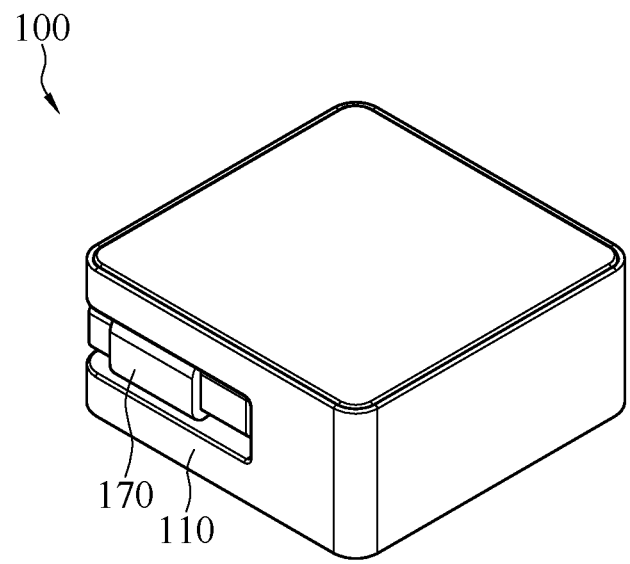
FIG. 1A illustrates a perspective view of a cable-winding charger according to some embodiments of the instant disclosure.
Figure 1B:
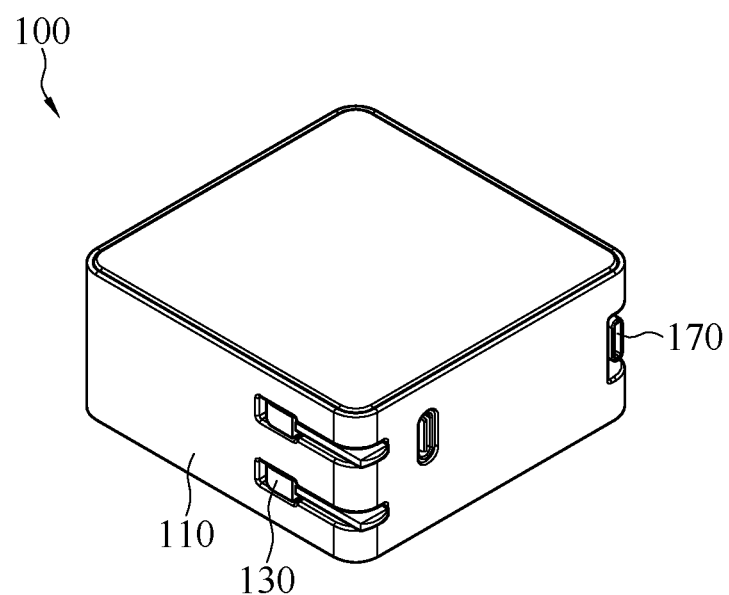
FIG. 1B illustrates another perspective view of the cable-winding charger according to some embodiments of the instant disclosure.
Figure 2:
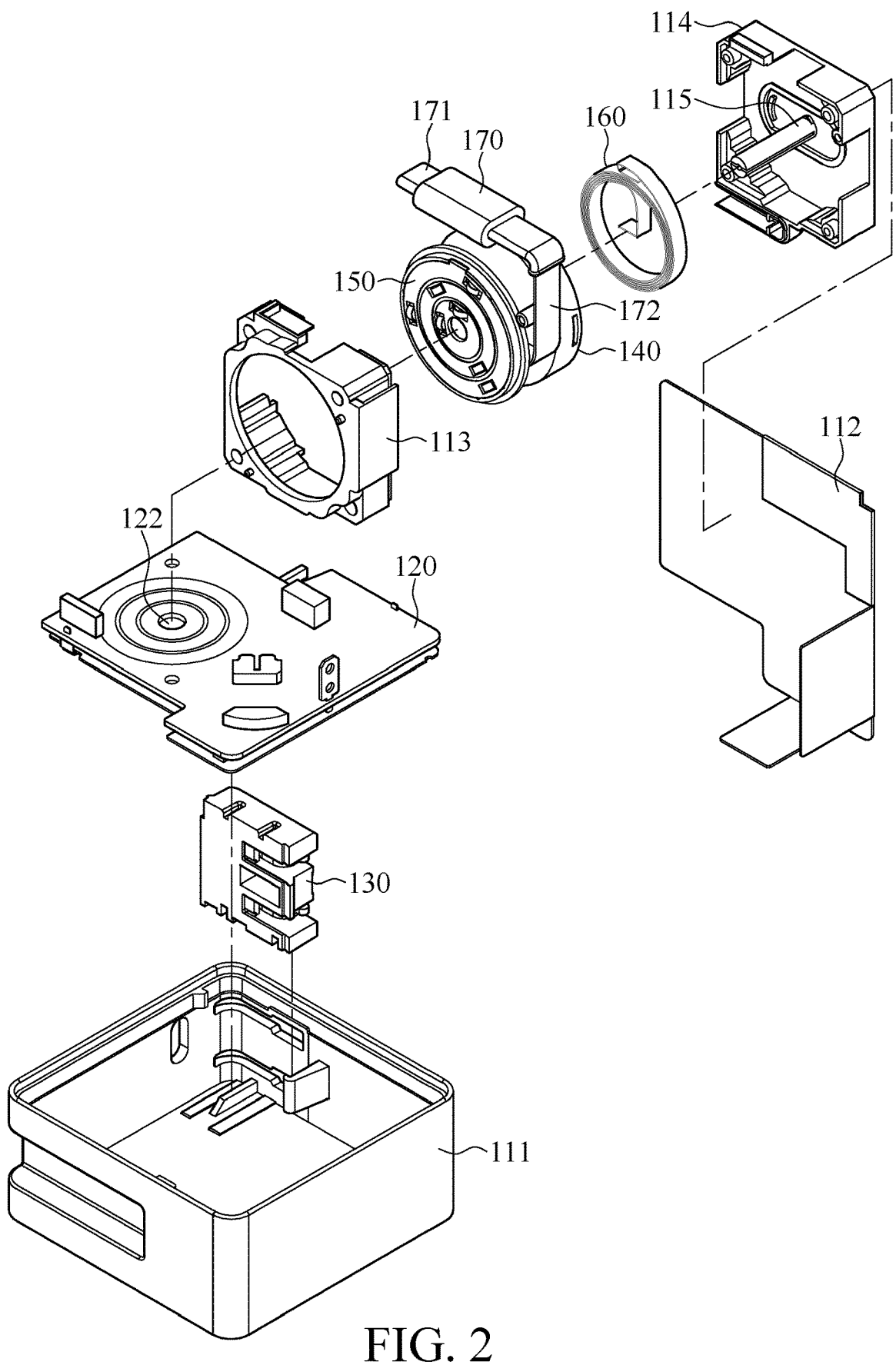
FIG. 2 illustrates an exploded view of the cable-winding charger according to some embodiments of the instant disclosure.

Please refer to FIG. 1A, FIG. 1B, and FIG. 2. FIG. 1A and FIG. 1B respectively illustrate perspective views of a cable-winding charger according to some embodiments of the instant disclosure. FIG. 2 illustrates an exploded view of the cable-winding charger according to some embodiments of the instant disclosure. In one or some embodiments, the cable-winding charger 100 comprises a housing 110, a main circuit board 120, a plug 130, a pivot base 140, a sub circuit board 150, a torsion spring 160, and a data cable 170.

Figure 3:
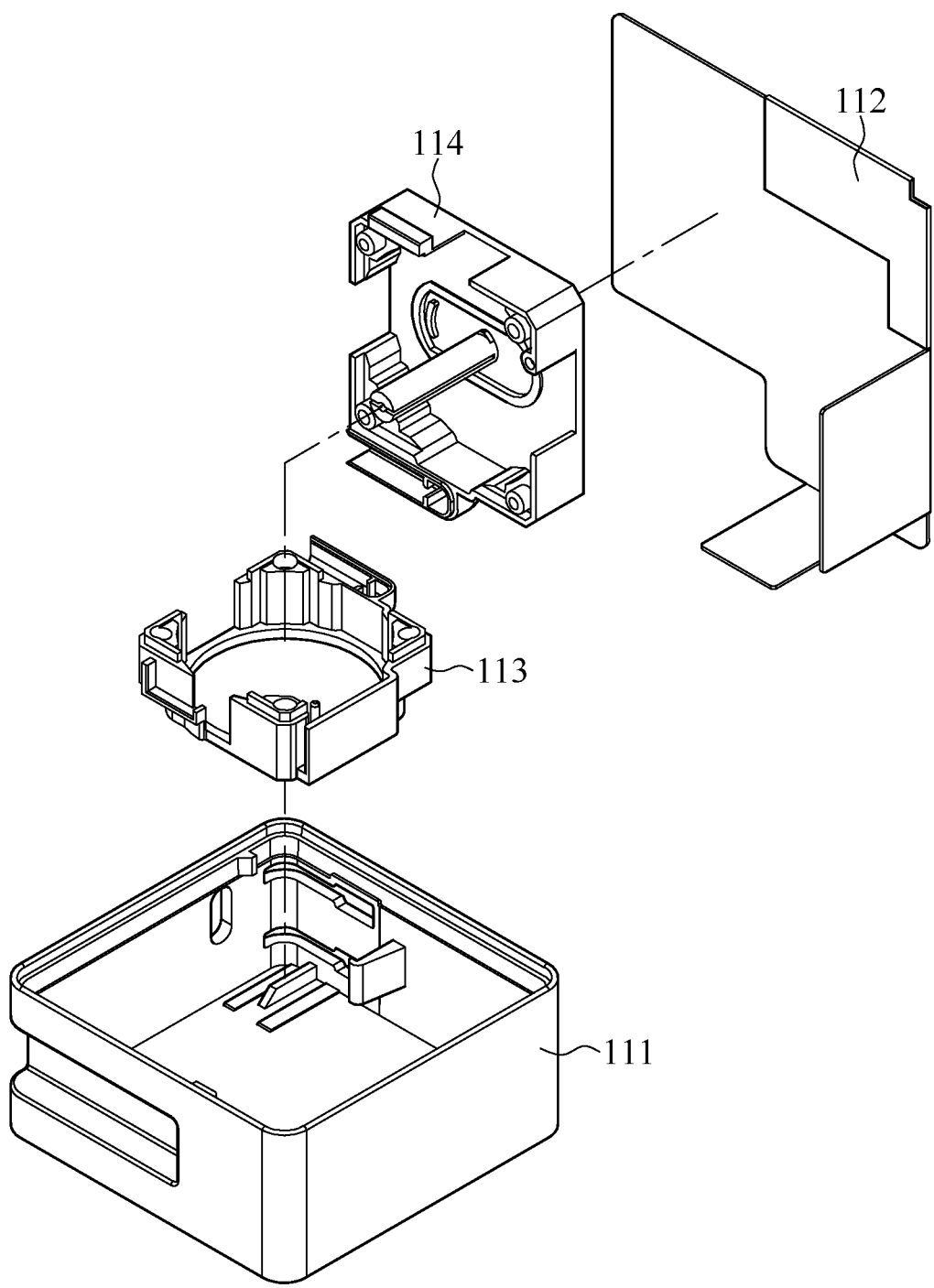
FIG. 3 illustrates an exploded view of the housing of the cable-winding charger according to some embodiments of the instant disclosure.

Please further refer to FIG. 3. FIG. 3 illustrates an exploded view of the housing of the cable-winding charger according to some embodiments of the instant disclosure. In some embodiments, the housing 110 comprises an outer shell 111, an outer cover 112, a lower shell 113, and an upper shell 114. The lower shell 113 and the upper shell 114 correspond to each other. Therefore, when the upper shell 114 is assembled with the lower shell 113, a hollow structure is between the upper shell 114 and the lower shell 113. One side of the inner wall of the upper shell 114 comprises a column 115. A side surface of the lower shell 113 has an opening. The side surface is a surface of the lower shell 113 corresponding to the main circuit board 120. A hollow structure is between the outer shell 111 and the outer cover 112, and the hollow structure can receive the assembly of the upper shell 113 and the lower shell 114.

Figure 4:
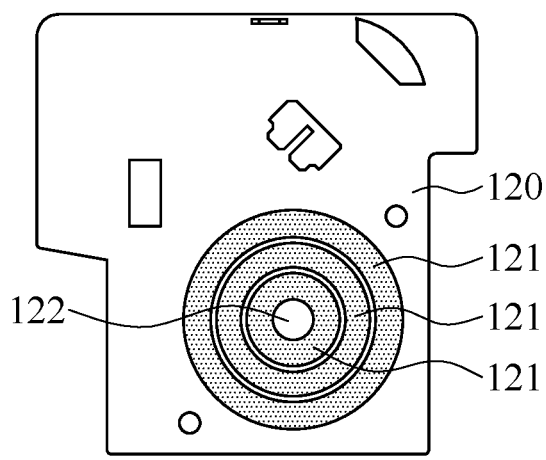
FIG. 4 illustrates a schematic view showing the arrangement of the conductive rings of the main circuit board of the cable-winding charger according to some embodiments of the instant disclosure.
Figure 5:
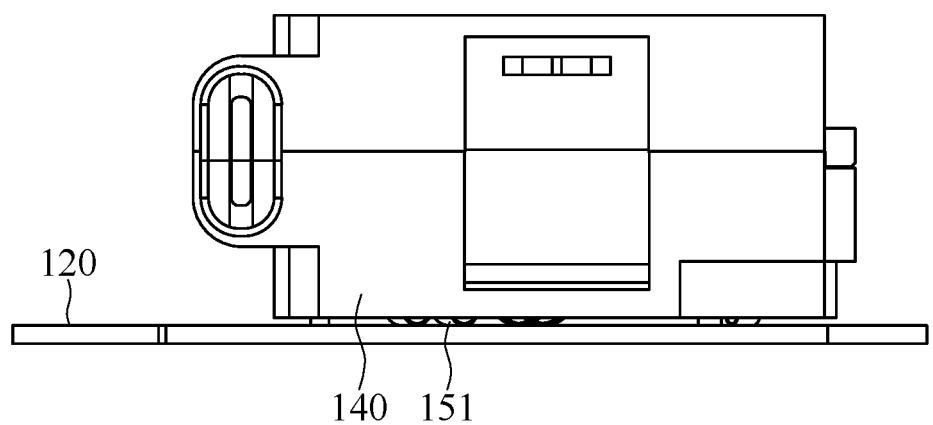
FIG. 5 illustrates a schematic view showing the arrangement of the conductive pieces and the conductive rings of the cable-winding charger according to some embodiments of the instant disclosure.

Please refer to FIG. 2 again. The main circuit board 120 is in the housing 110. The main circuit board 120 is between the outer shell 111 and the lower shell 113. In some embodiments, the main circuit board 120 is fixedly mounted to an inner surface of the outer shell 111. The main circuit board 120 has a shaft hole 122, the shaft hole 122 corresponds to the column 115 and allows the column 115 to pass therethrough. The main circuit board 120 comprises a plurality of conductive rings 121 (as shown in FIG. 4). The conductive rings 121 are coaxially arranged around the column 115. Specifically, in this embodiment, the conductive rings 121 are of a concentric configuration, and the adjacent conductive rings 121 are spaced from each other in the radial direction of the conductive rings 121. In other words, in this embodiment, the diameters of the conductive rings 121 are different from each other, and the conductive rings 121 are arranged on the main circuit board 120 by taking the shaft hole 122 as the center of circle. Therefore, the conductive rings 121 do not intersect with each other. In some embodiments, an insulation ring is arranged between two adjacent conductive rings 121, and the insulation ring is provided for preventing the electrical connection of adjacent conductive rings 121 to cause short-circuit connection. The main circuit board 120 and the sub circuit board 150 are spaced from each other and parallel to each other (such configuration will be described in the following paragraphs), such that the main circuit board 120 and the sub circuit board 150 do not contact each other directly, as shown in FIG. 5.

Figure 6A:
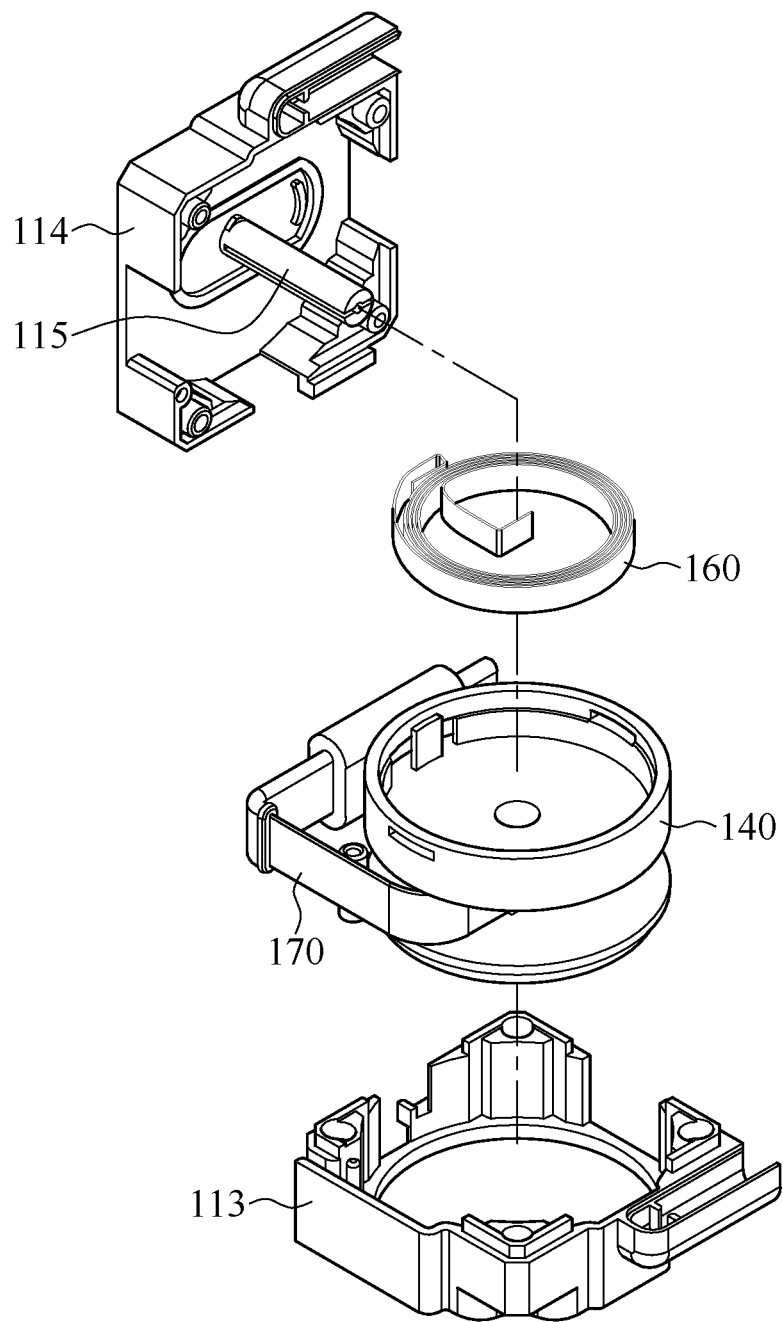
FIG. 6A illustrates an exploded view of the pivot base and the housing of the cable-winding charger according to some embodiments of the instant disclosure.
Figure 7A:
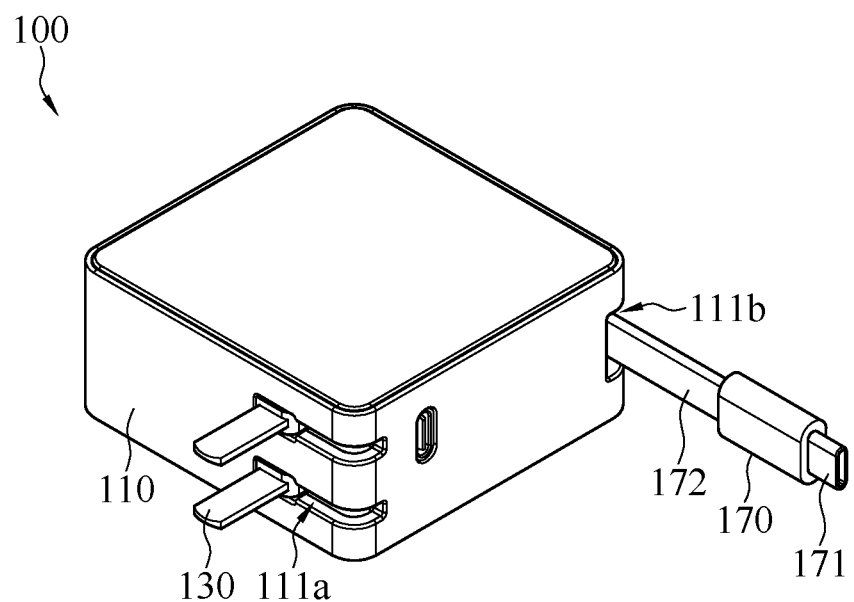
FIG. 7A illustrates a schematic view showing that the plug is at the turned-out position, according to some embodiments of the instant disclosure.
Figure 7B:
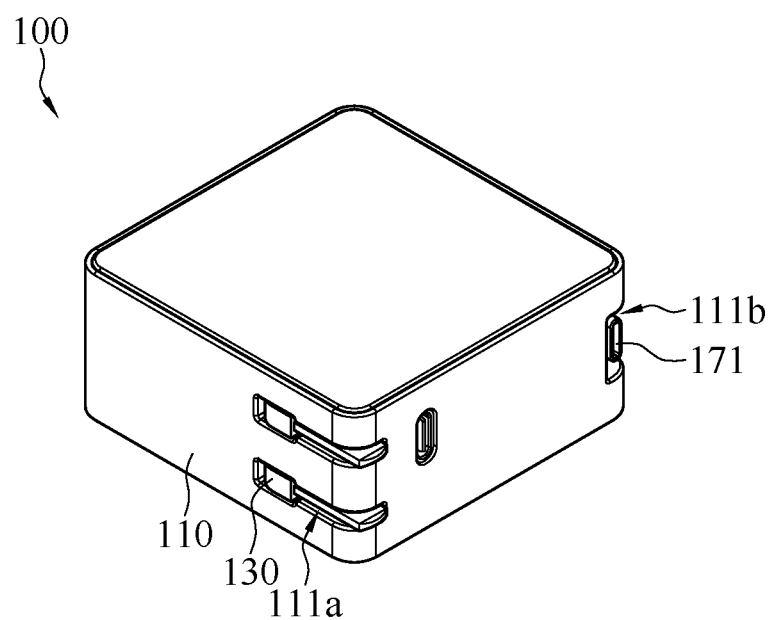
FIG. 7B illustrates a schematic view showing that the plug is at the received position, according to some embodiments of the instant disclosure.

One of two ends of the plug 130 is pivotally connected to the housing 110 (the pivoting between the plug 130 and the housing 110 can be seen from FIG. 7A and FIG. 7B), and the plug 130 is electrically connected to the main circuit board 120. The plug 130 is adapted to be mated with a receptacle (not shown) to receive an external power, and the plug 130 then transmits the external power to the main circuit board 120. The pivot base 140 is pivotally connected to the housing 110. Therefore, the pivot base 140 is rotatable relative to the housing 110 by taking the column 115 as the rotation axis (as shown in FIG. 6A). The pivot base 140 is in the hollow structure formed by the upper shell 114 and the lower shell 113. The pivot base 140 comprises a plurality of conductive pieces 151.

The sub circuit board 150 is between the pivot base 140 and the lower shell 113. In some embodiments, the sub circuit board 150 is fixed to the pivot base 140. Moreover, one of two ends of the data cable 170 is fixed to the pivot base 140, and a portion of the data cable 170 is winded on the pivot base 140. When a user pulls the data cable 170 out, the pulling drives the pivot base 140 and the sub circuit board 150 to rotate.

Figure 6B:
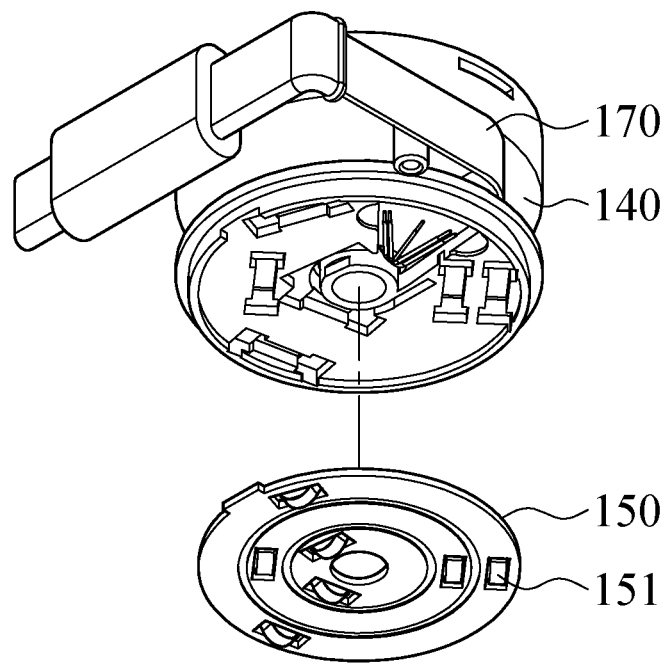
FIG. 6B illustrates an exploded view of the pivot base and the sub circuit board of the cable-winding charger according to some embodiments of the instant disclosure.
Figure 6C:
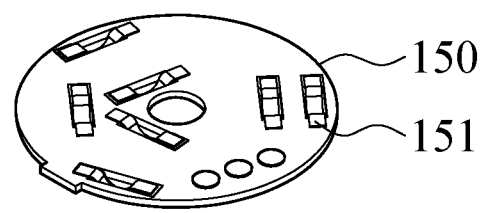
FIG. 6C illustrates a schematic view of the conductive pieces and the holes of the sub circuit board of the cable-winding charger according to some embodiments of the instant disclosure.

The conductive pieces 151 are disposed on the sub circuit board 150, and a plurality of holes (not labelled) is on the sub circuit board 150, as shown in FIG. 6B. The position of each of the holes corresponds to the position of the corresponding conductive piece 151, and the size of the holes corresponds to the size of the conductive pieces 151. The conductive pieces 151 are disposed on a side surface of the sub circuit board 150 and the pivot base 140. In some embodiments, one of two ends of the conductive piece 151 is soldered on a side wall of the hole (as shown in FIG. 6C), such that the conductive piece 151 is fixed to the sub circuit board 150. The other end of the conductive piece 151 may be soldered on the sub circuit board 150 (or may be not soldered on the sub circuit board 150), such that the conductive piece 151 elastically contacts the conductive ring 121.

The conductive piece 151 protrudes out of the surface of the sub circuit board 150 through the hole, such that the conductive piece 151 contacts the conductive ring 121 of the main circuit board 120. For example, when the distance between the main circuit board 120 and the sub circuit board 150 is L, the protruded height of the conductive piece 151 protruding out of the sub circuit board 150 is h. The protruded height (h) of the conductive piece 151 at least is equal to the distance (L) or is greater than the distance (L) (L and h are not labelled in the figures), as shown in FIG. 5.

The conductive pieces 151 correspond to the conductive rings 121. That is, in this embodiment, each of the conductive rings 121 corresponds to at least one of the conductive pieces 151. Moreover, during the rotation of the pivot base 140, the conductive piece 151 slides along the corresponding conductive ring 121.

The electrical connection between the main circuit board and the sub circuit board is achieved by the contact between the conductive piece and the conductive ring. Since the contact area between the conductive piece and the conductive ring is small, the friction between the pivot base and the main circuit board is small when the pivot base rotates relative to the main circuit board. Therefore, the pivot base can be rotated smoothly and is not stuck easily.

The number of the conductive piece 151 is determined by the transmission protocol adopted by the data cable 170. In the case that the data cable has the USB type-C communication protocol, for the pin assignment of the USB type-C communication protocol, two power terminals and two ground terminals are provided. Therefore, the number of the conductive pieces 151 should be at least more than two. In general, the total number of the conductive pieces 151 is greater than the total number of the conductive rings 121 (the arrangement of the conductive pieces 151 is described in the following paragraphs).

One of two ends of the torsion spring 160 is fixed to the column 115, and the other end of the torsion spring 160 is fixed to the pivot base 140, as shown in FIG. 6A. When the pivot base 140 is rotated and released, the elastic force of the torsion spring 160 moves the pivot base 140 back to its original position. The cable body 172 of the data cable 170 is winded around the pivot base 140, and the connection port 171 is exposed out of the housing 110. In some embodiments, the end of the cable body 172 electrically connected to the conductive pieces 151 is fixed to the pivot base 140. Accordingly, when the data cable 170 is pulled out or retracted, the connection between the cable body 170 and the conductive pieces 151 are not affected. Hence, the electrical connection between the cable body 170 and the conductive pieces 151 are not affected.

Please refer to FIG. 7A and FIG. 7B. FIG. 7A illustrates a schematic view showing that the plug is at the turned-out position according to some embodiments of the instant disclosure, and FIG. 7B illustrates a schematic view showing that the plug is at the received position according to some embodiments of the instant disclosure. According to some embodiments, the outer shell 111 comprises a first receiving space 111a and a second receiving space 111b. The first receiving space 111a is provided for receiving the plug 130, and the second receiving space 111b is provided for receiving the data cable 170. The plug 130 can be rotated between a turned-out position and a received position. When the plug 130 is rotated to the turned-out position, the other end of the plug 130 protrudes out of the housing 110, as shown in FIG. 7A. Furthermore, when the plug 130 is rotated to the turned-out position, the user can connect the cable-winding charger 100 to the socket of the mains supply. When the cable-winding charger 100 is not in use, the user can rotate the plug 130 to the received position, such that the plug 130 is received in the first receiving space 111a, as shown in FIG. 7B.

For the sake of convenience in describing the in-use state and the not-in-use state of the data cable 170, a pulled-out state and a received state of the data cable 170 are respectively defined. When the user pulls the data cable 170 out, the pulling of the data cable 170 drives the pivot base 140 to rotate in a direction, such that the torsion spring 160 is compressed to be in an energy-stored state. Meantime, the connection port 171 of the data cable 170 and a portion of the cable body 172 are exposed out of the housing 110, and such state is defined as the pulled-out state of the data cable 170. When the user releases the cable body 172, the resilient elastic force of the torsion spring 160 drives the pivot base 140 to rotate in a counter direction, such that the cable body 172 is winded and retracted into the housing 110. In this embodiment, the state that the cable body 172 is received in the housing 110 and the connection port 171 is received in the second receiving space 111b is defined as the received state of the data cable 170.

Figure 8:
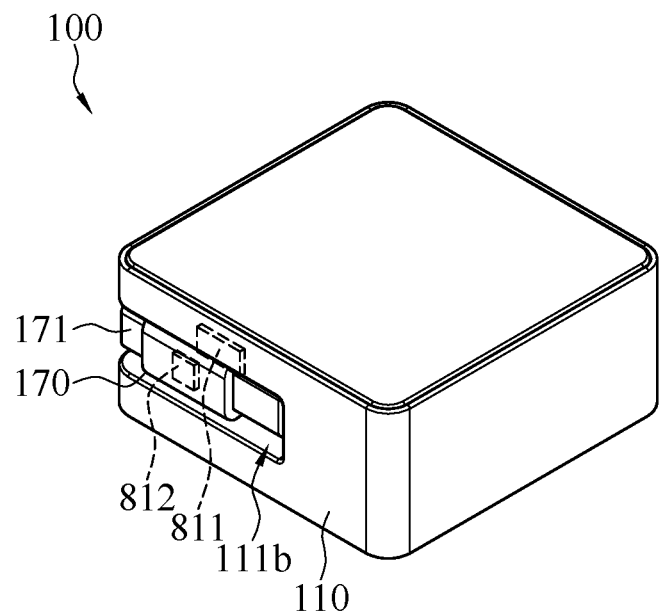
FIG. 8 illustrates a schematic view of the adhering member of the connection port and the magnetic member of the cable-winding charger according to some embodiments of the instant disclosure.

According to some embodiments, the outer shell 111 comprises a magnetic member 811, and the magnetic member 811 is adjacent to the second receiving space 111b. The data cable 170 comprises an adhering member 812, and the adhering member 812 is at a side portion of the connection port 171. The magnetic member 811 and the adhering member 812 may be magnetically adhered to each other. Specifically, in some embodiments, the two members are both magnets; alternatively, one of the two members is a magnet, and the other member is made of ferromagnetic material. The position of the adhering member 812 corresponds to the position of the magnetic member 811. As shown in FIG. 8, when the connection port 171 of the data cable 170 is in the received state, the position of the adhering member 812 corresponds to the position of the magnetic member 811, such that the adhering member 812 of the connection port 171 and the magnetic member 811 are adhered to each other. Therefore, the fixation force for fixing the connection port 171 on the outer shell 111 can be improved.

Figure 9A:
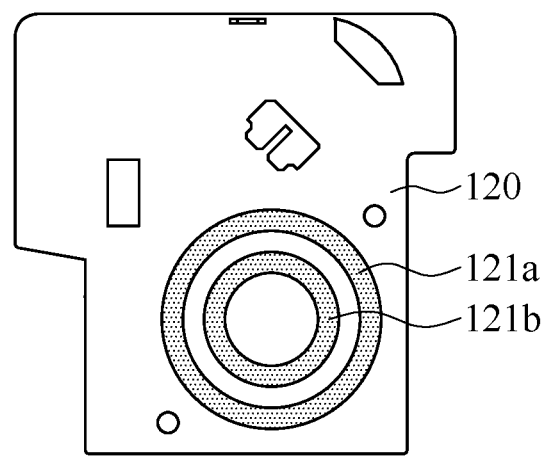
FIG. 9A illustrates a schematic view of the outer ring and the inner ring of the conductive rings of the cable-winding charger according to some embodiments of the instant disclosure.

According to some embodiments, the conductive rings 121 comprise an outer ring 121a and at least one inner ring 121b, as shown in FIG. 9A. In FIG. 9A, the conductive rings 121 are one outer ring 121a and one inner ring 121b as an illustrative example. The conductive pieces 151 are arranged at positions capable of contacting the outer ring 121a, such that the conductive pieces 151 can contact the conductive rings 121, thereby achieving the electrical connection between the main circuit board 120 and the sub circuit board 150. In the case that the number of the conductive pieces 151 contacting the outer ring 121a is three, the three conductive pieces 151 may be evenly arranged on the outer ring 121a. In this embodiment, the three conductive pieces 151 are formed as an equilateral triangle structure on the outer ring 121a, as shown in FIG. 9B.

Figure 9B:
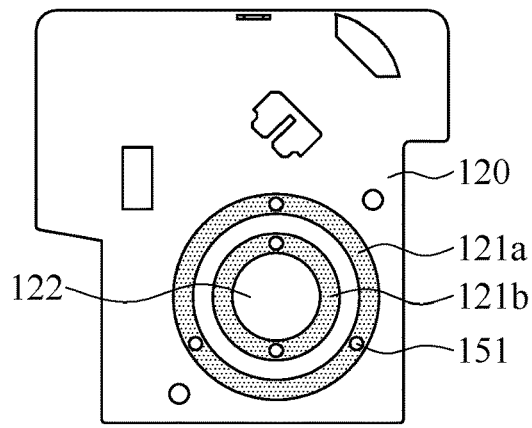
FIG. 9B illustrates a schematic view showing that the conductive pieces correspond to the conductive rings, according to some embodiments of the instant disclosure.

In FIG. 9B, the "circle" symbols on the conductive rings 121 are provided for indicating the positions of the conductive pieces 151 on the conductive rings 121. Since the three conductive pieces 151 are evenly arranged on the outer ring 121a, the pivot base 140 can be stably disposed on the main circuit board 120. Moreover, during the user operates the charger to change the state of the data cable 170 from the received state to the pulled-out state, the pivot base 140 is evenly forced by the main circuit board 120, thereby providing a better operation feeling for the user. Rest of the conductive pieces 151 may be freely arranged at position(s) capable of contacting the inner ring 121b. In general, the three conductive pieces 151 arranged on the outer ring 121a may be connected to the power line of the data cable 170, and at least one conductive piece 151 is arranged on the inner ring 121b to be connected to the ground line of the data cable 170. As shown in FIG. 9B, two conductive pieces 151 are arranged on two opposite sides of the inner ring 121b. Therefore, during the outer ring 121a and the conductive pieces 151 on the outer ring 121a are rotated with respect to each other, the contact between the inner ring 121b and the conductive pieces 151 on the inner ring 121b can be ensured.

Figure 9C:
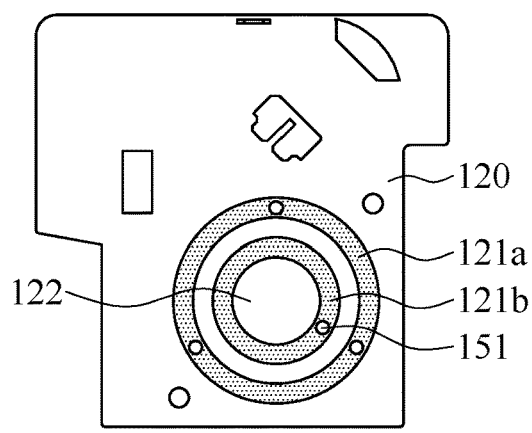
FIG. 9C illustrates a schematic view showing that the conductive pieces correspond to the conductive rings, according to some embodiments of the instant disclosure.
Figure 9D:
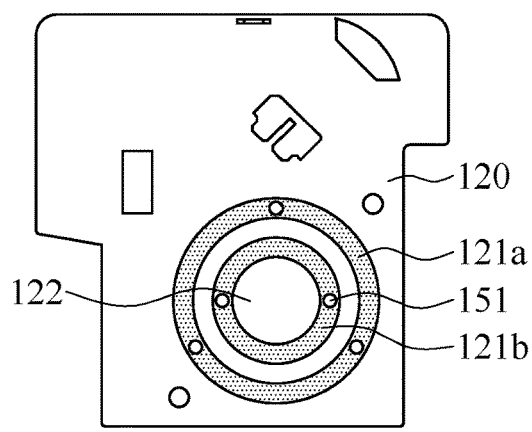
FIG. 9D illustrates a schematic view showing that the conductive pieces correspond to the conductive rings, according to some embodiments of the instant disclosure.

For the sake of convenience in describing the positions of the conductive pieces 151 on the conductive rings 121, the positions of the conductive pieces 151 on the sub circuit board 150 are regarded as the positions of the conductive pieces 151 on the corresponding conductive rings 121. In this embodiment, the conductive pieces 151 may be spacedly arranged on the outer ring 121a and on the inner ring 121b, as shown in FIG. 9C. In FIG. 9C, three conductive pieces 151 are arranged on the outer ring 121a, and one conductive piece 151 is arranged on the inner ring 121b, such that three of the three conductive pieces 151 on the outer ring 121a are together formed as an isosceles triangle structure. Alternatively, as shown in FIG. 9D, three conductive pieces 151 are arranged on the outer ring 121a, and two conductive pieces 151 are arranged on opposite sides of the inner ring 121b. In this embodiment, since the conductive pieces 151 are evenly arranged on the conductive rings 121, the rotation of the pivot base 140 between the received state and the pulled-out state can be performed smoothly.

The aforementioned configurations of the conductive pieces and the conductive rings are provided as illustrative examples, not limitations to the embodiments of the instant disclosure. It is understood that, the conductive pieces and the conductive rings may be arranged according to practical requirements, and thus the configurations of the conductive pieces and the conductive rings are not specifically limited.

Figure 10A:
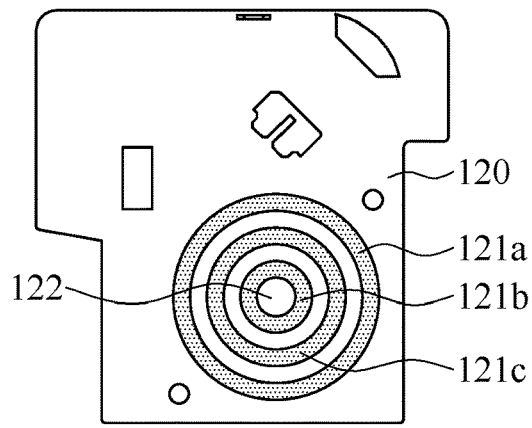
FIG. 10A illustrates a schematic view of the outer ring, the middle ring, and the inner ring of the conductive rings of the cable-winding charger according to some embodiments of the instant disclosure.
Figure 10B:
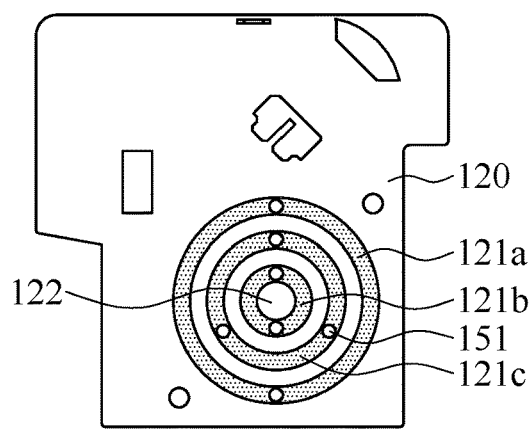
FIG. 10B illustrates a schematic view showing that the conductive pieces correspond to the conductive rings, according to some embodiments of the instant disclosure.
Figure 10C:
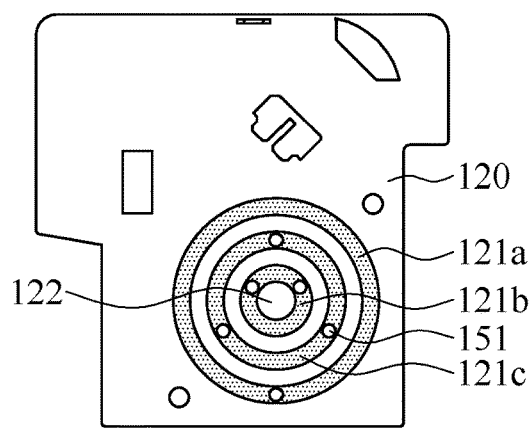
FIG. 10C illustrates a schematic view showing that the conductive pieces correspond to the conductive rings, according to some embodiments of the instant disclosure.

In some embodiments, the conductive rings 121 are an outer ring 121a, a middle ring 121c, and at least one inner ring 121b, as shown in FIG. 10A. In FIG. 10A, the conductive rings 121 are one outer ring 121a, one middle ring 121c, and one inner ring 121b as an illustrative example. In this embodiment, three conductive pieces 151 are evenly arranged at positions capable of contacting the middle ring 121c, such that the conductive pieces 151 can contact the conductive rings 121, as shown in FIG. 10B. In FIG. 10B, the outer ring 121a contacts two conductive pieces 151. Moreover, in FIG. 10B, the conductive pieces 151 corresponding to the outer ring 121a are further connected to the power line of the data cable 170, the conductive pieces 151 corresponding to the middle ring 121c are connected to the data line of the data cable 170, and the conductive pieces 151 corresponding to the inner ring 121b are connected to the ground line of the data cable 170. It should be noted that, different numbers of additional conductive pieces 151 may be respectively arranged on the outer ring 121a and the inner ring 121b, as shown in FIG. 10C.

Figure 11A:
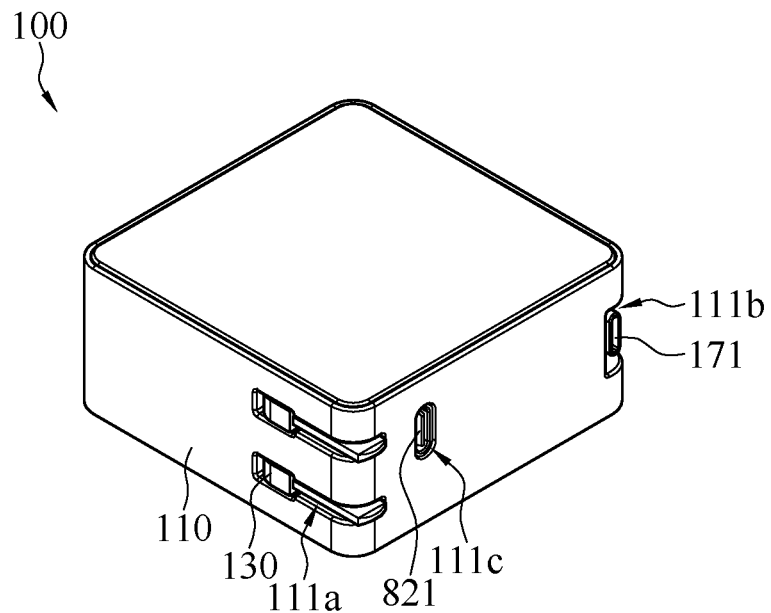
FIG. 11A illustrates a schematic view showing that the adapter is received in the third receiving space, according to some embodiments of the instant disclosure.
Figure 11B:
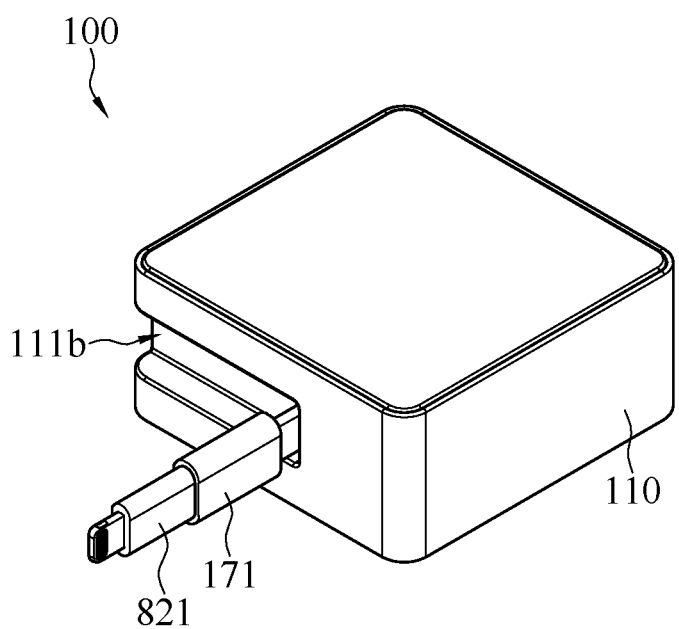
FIG. 11B illustrates a schematic view showing that the adapter is connected to the connection port, according to some embodiments of the instant disclosure.

According to some embodiments, the outer shell 111 comprises a third receiving space 111c. The third receiving space 111c is provided for receiving an adapter 821, as shown in FIG. 11A. One of two ends of the adapter 821 is mated with the connection port 171 of the data cable 170, and the other end of the adapter 821 is a connector. The connector may be, but not limited to, a lightning connector, a USB type-A connector, a micro USB connector, or a mini USB connector. When the user wants to use the adapter 821, the user can take the adapter 821 out of the third receiving space 111c. Then, the user can connect one end of the adapter 821 to the connection port 171, such that the connection port 171 is compatible with connectors in other communication protocols through the adapter 821, as shown in FIG. 11B. In FIG. 11B, as an example, the adapter 821 is a USB type-C to lightning adapter.

Figure 12:
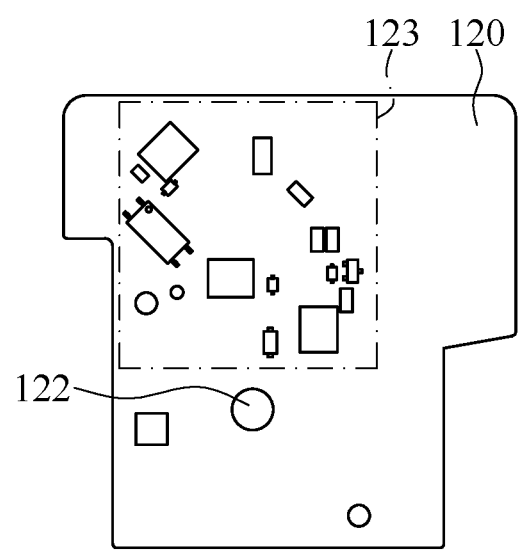
FIG. 12 illustrates a schematic view showing that the transformer circuit is connected to the main circuit board, according to some embodiments of the instant disclosure.

In some embodiments, the main circuit board 120 further comprises a transformer circuit 123. The transformer circuit 123 is connected to the plug 130 and the main circuit board 120, as shown in FIG. 12. The transformer circuit 123 is provided for converting the external power from the plug 130 into a working power and transmitting the working power to the connection port 171 through the conductive pieces 151 and the sub circuit board 150. In this embodiment, the transformer circuit 123 is arranged in the backboard of the main circuit board 120, as shown in FIG. 12.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A cable-winding charger, comprising:
    a housing comprising a column;
    a main circuit board in the housing and comprising a plurality of conductive rings, wherein the conductive rings are coaxially arranged around the column;
    a plug, wherein one of two ends of the plug is pivotally connected to the housing and is electrically connected to the main circuit board;
    a pivot base, wherein the pivot base is pivotally connected to the housing by taking the column as a pivoting axis, and wherein the pivot base comprises a plurality of conductive pieces, and each of the conductive pieces contacts the corresponding conductive ring;
    a torsion spring, wherein one of two ends of the torsion spring is fixed to the column, and the other end of the torsion spring is fixed to the pivot base;
    a data cable comprising a connection port and a cable body, wherein one of two ends of the cable body is electrically connected to the conductive pieces, and the other end of the cable body is electrically connected to the connection port, wherein a portion of the cable body is winded around the pivot base, and the connection port is exposed out of the housing, and wherein when the torsion spring is in a released state, the connection port is in a received state; and
    a sub circuit board, wherein a plurality of holes is on the sub circuit board and the conductive pieces are disposed on the sub circuit board, wherein the sub circuit board is fixedly disposed on the pivot base, and wherein each of the conductive pieces passes through the corresponding hole, and one end of each of the conductive pieces is fixed to one side of the corresponding hole.

2. The cable-winding charger according to claim 1, wherein the conductive rings are an outer ring and at least one inner ring, and at least three of the conductive pieces are spacedly arranged on the outer ring.

3. The cable-winding charger according to claim 1, wherein the conductive rings are an outer ring, a middle ring, and at least one inner ring, and at least three of the conductive pieces are spacedly arranged on the middle ring.

4. The cable-winding charger according to claim 1, wherein the housing comprises an outer shell, an outer cover, a lower shell, and an upper shell, wherein the upper shell comprises the column, the pivot base and the torsion spring are received between the lower shell and the upper shell, wherein the lower shell and the main circuit board are fixed to the outer shell, and wherein the lower shell and the upper shell are received between the outer shell and the outer cover.

5. The cable-winding charger according to claim 4, wherein the conductive rings are an outer ring and at least one inner ring, and at least three of the conductive pieces are spacedly arranged on the outer ring.

6. The cable-winding charger according to claim 4, wherein the conductive rings are an outer ring, a middle ring, and at least one inner ring, and at least three of the conductive pieces are spacedly arranged on the middle ring.

7. The cable-winding charger according to claim 1, wherein the housing further comprises a first receiving space, and the plug is capable of being rotated between a turned-out position and a received position, wherein when the plug is rotated to the turned-out position, the other end of the plug protrudes out of the housing, and wherein when the plug is rotated to the received position, the plug is in the first receiving space.

8. The cable-winding charger according to claim 7, wherein the conductive rings are an outer ring and at least one inner ring, and at least three of the conductive pieces are spacedly arranged on the outer ring.

9. The cable-winding charger according to claim 7, wherein the conductive rings are an outer ring, a middle ring, and at least one inner ring, and at least three of the conductive pieces are spacedly arranged on the middle ring.

10. The cable-winding charger according to claim 7, further comprising a magnetic member, wherein the connection port comprises an adhering member, and wherein when the connection port is at the received state, the adhering member contacts the magnetic member.

11. The cable-winding charger according to claim 10, wherein the housing comprises an outer shell, an outer cover, a lower shell, and an upper shell, wherein the upper shell comprises the column, the pivot base and the torsion spring are received between the lower shell and the upper shell, wherein the lower shell and the main circuit board are fixed to the outer shell, and wherein the lower shell and the upper shell are received between the outer shell and the outer cover.

12. The cable-winding charger according to claim 7, further comprising an adapter, wherein one of two ends of the adapter is mated with the connection port, and the other end of the adapter is a connector, and types of the connector and the connection port are different, and wherein the housing further comprises a third receiving space, and the third receiving space is adapted to receive the adapter.

13. The cable-winding charger according to claim 12, wherein the housing comprises an outer shell, an outer cover, a lower shell, and an upper shell, wherein the upper shell comprises the column, the pivot base and the torsion spring are received between the lower shell and the upper shell, wherein the lower shell and the main circuit board are fixed to the outer shell, and wherein the lower shell and the upper shell are received between the outer shell and the outer cover.

14. The cable-winding charger according to claim 7, wherein the housing comprises an outer shell, an outer cover, a lower shell, and an upper shell, wherein the upper shell comprises the column, the pivot base and the torsion spring are received between the lower shell and the upper shell, wherein the lower shell and the main circuit board are fixed to the outer shell, and wherein the lower shell and the upper shell are received between the outer shell and the outer cover.

15. The cable-winding charger according to claim 14, wherein the conductive rings are an outer ring and at least one inner ring, and at least three of the conductive pieces are spacedly arranged on the outer ring.

16. The cable-winding charger according to claim 14, wherein the conductive rings are an outer ring, a middle ring, and at least one inner ring, and at least three of the conductive pieces are spacedly arranged on the middle ring.

17. The cable-winding charger according to claim 7, wherein the housing further comprises a second receiving space, wherein when the connection port is in the received state, the connection port is in the second receiving space, and wherein when the connection port is in a pulled-out state, the torsion spring is in an energy-stored state.

18. The cable-winding charger according to claim 17, wherein the housing comprises an outer shell, an outer cover, a lower shell, and an upper shell, wherein the upper shell comprises the column, the pivot base and the torsion spring are received between the lower shell and the upper shell, wherein the lower shell and the main circuit board are fixed to the outer shell, and wherein the lower shell and the upper shell are received between the outer shell and the outer cover.

19. The cable-winding charger according to claim 17, wherein the conductive rings are an outer ring and at least one inner ring, and at least three of the conductive pieces are spacedly arranged on the outer ring.

* * * * *